United States Patent [19]
Ellis

[11] Patent Number: 5,721,540
[45] Date of Patent: Feb. 24, 1998

[54] APPARATUS FOR RECORDING VEHICLE POSITION

[76] Inventor: David M. Ellis, R.R. Box 109, Warren, Vt. 05674

[21] Appl. No.: 698,784

[22] Filed: Aug. 16, 1996

[51] Int. Cl.[6] .................................................. G06G 1/123
[52] U.S. Cl. ............................. 340/988; 364/449.7
[58] Field of Search ........................... 340/988, 439, 340/438, 426, 573, 995; 364/424.04, 449, 449.7; 342/457

[56] References Cited

U.S. PATENT DOCUMENTS

| | | | |
|---|---|---|---|
| 4,093,939 | 6/1978 | Mitchell | 340/439 |
| 5,014,206 | 5/1991 | Scribner et al. | 364/449 |
| 5,303,163 | 4/1994 | Ebaugh et al. | 364/424.04 |
| 5,359,528 | 10/1994 | Haendel et al. | 340/438 |
| 5,379,219 | 1/1995 | Ishibashi | 340/438 |
| 5,436,612 | 7/1995 | Aduddell | 340/438 |
| 5,475,597 | 12/1995 | Buck | 340/438 |
| 5,489,898 | 2/1996 | Shigekusa et al. | 340/988 |
| 5,497,149 | 3/1996 | Fast | 340/988 |
| 5,499,182 | 3/1996 | Ousborne | 364/424.04 |
| 5,548,273 | 8/1996 | Nicol et al. | 340/439 |
| 5,570,087 | 10/1996 | Lemelson | 340/439 |
| 5,581,464 | 12/1996 | Wollet et al. | 340/438 |

*Primary Examiner*—Brent A. Swarthout
*Attorney, Agent, or Firm*—Thomas N. Neiman

[57] ABSTRACT

The apparatus for recording vehicle position is designed to provide the user with a system for recording date, time and vehicle position utilizing information available from a Global Positioning System receiver. The recorded information is called a position log. The position log, in the form of a data file, can be transferred to a computer and reviewed at a later time. The apparatus contains devices which detect attempts at altering the position log, making the position log certifiably authentic and usable in legal proceedings. The apparatus has a Global Positioning System receiver, a clock, a microprocessor and independent vehicle motion sensing capability. The apparatus connects to the Global Positioning System antenna and the vehicle battery. All parts of the apparatus are enclosed in a sealed container which prevents alteration of the position log by substituting simulated Global Positioning System data for the real data in the position log.

8 Claims, 1 Drawing Sheet

APPARATUS FOR RECORDING VEHICLE POSITION

BACKGROUND OF THE INVENTION

This invention pertains to position recording devices and, in particular, to a position recording system that can detect attempts to alter evidence of vehicle position. The unique properties of information provided by the Global Positioning System are utilized to authenticate vehicle position logs.

There are a number of reasons for using global position systems and insuring that the readings obtained from that type system are accurate. Restrictions are often imposed on drivers. Teenagers may be allowed to drive only during daylight hours. There can be a need to provide proof of achievement in sporting event and in competitions. Persons convicted of driving offenses may be limited to drive to and from work. Parolees may have injunctions against driving to certain locations. Perpetrators of domestic violence may be forbidden from driving in the vicinity of a potential victim. Rental cars may be restricted from being driven into Mexico. Rental aircraft operations may be restricted to an area within a certain distance of a specific airport or to certain times and weather conditions.

Global position system receivers obtain position and time information from a plurality of satellites. Recorded information can show where a vehicle has been, when it was there and how fast it was traveling. A stored motion log is comprised of date, time latitude and longitude information for each position fix and is transferred from a motion recorder and displayed on a computer screen and will reveal where the vehicle has gone and the speed it has been traveling. These logs could be used to ensure that individuals who disobey the law could be penalized, which would improve public safety. The difficulty to be overcome would be to be able to know when the recording system has been disabled. Power can be removed from the recorder or the signals from the satellite can be prevented from reaching the receiver or bogus signals inserted. What is needed is a device that will either prevent these occurrences or be readily identifiable when those occurrences take place.

There have been a number of attempts to deal with these problems. The U.S. Pat. No. 5,485,161 issued to David Vaughn, on Jan. 16, 1996 for a "Vehicle Speed Control Based on GPS/Map Matching of Posted Speeds", shows a unit having a complicated mechanism using a program to measure vehicle speed. The U.S. Pat. No. 5,450,329 issued to Jesse H. Tanner on Sep. 12, 1995 for a "Vehicle Location Method and System" shows a device that uses timed measurements of signals to determine latitude and longitude.

What is needed is an independent vehicle motion detection apparatus to complement information coming from the global positioning system satellites. What is also needed is a way to detect if power has been removed from the apparatus or if erroneous signals have been fed into the apparatus in an attempt to alter the log. This information allows detection of attempts to alter the recorded position log.

It is the object of this invention to teach a vehicle position recorder which avoids the disadvantages and limitations, recited above. It is also the object of this invention to teach means to detect attempts to alter position logs in a vehicle position recorder. Another object of this invention is to provide an apparatus that is cost effective, consumes little power and is easy to install and use.

SUMMARY OF THE INVENTION

Particularly, it is the object of this invention to teach an apparatus for recording vehicle position, for use in applications that require detection of attempts to alter information being recorded, comprising housing means for enclosing said apparatus; a global positioning system receiver for obtaining time and position information from a satellite; a time measurement system; vehicle motion detection means for determining the movement of the vehicle at any time; a microprocessor having means for accepting data from said global positioning system receiver and for controlling said time measurement system; a position log memory for retaining time and position data; means for supplying power to said apparatus; and means for determining intervals of time when power is removed from said apparatus.

BRIEF DESCRIPTION OF THE DRAWINGS

Further objects and features of this invention will become more apparent by reference to the following description taken in conjunction with the following figure, in which.

DETAILED DESCRIPTION OF THE PREFERRED EMBODIMENT

Figure 1:
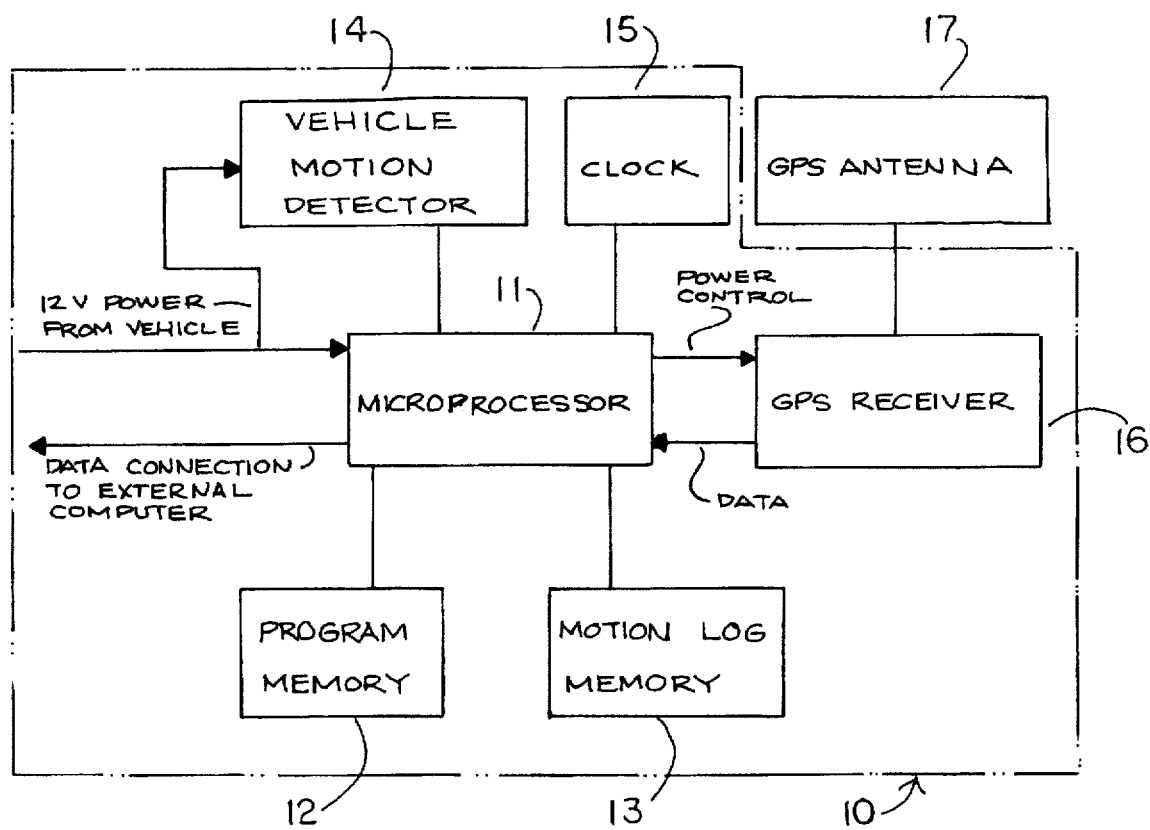
FIG. 1 is a block diagram of the apparatus for recording vehicle position.

As shown in the figure, the novel apparatus 10 comprises a low power microprocessing unit 11 having a program memory 12 and a position log memory 13 that is designed to store data even when power is removed from the apparatus 10. The microprocessing unit 11 also has measuring means 14 to determine the voltage supplied to the apparatus 10 and controls a time measurement system 15. The time measurement system 15 is set at the time the apparatus is sealed. The position log is provided updated time and date information from the global positioning system satellites in the form of a time entry or a time differential entry. The time measurement system 15 continues to operate when power is removed from the apparatus 10. The microprocessing unit 11 controls power to the global positioning system receiver 16 and obtains position and time data from the global positioning system receiver 16. The microprocessor may be embodied with an intelligence to determine how often position fixes must be recorded. It may also choose to record its data in differential rather than absolute form and can compress the data by means of incremental coding, varying the sample rates or the like.

Power is supplied to the apparatus 10 at all times by the vehicle battery. The power supply voltage is significantly higher when the engine is running than when it is not. Thus, the apparatus 10 can determine if the vehicle engine is running and therefor if vehicle motion is expected. The global positioning system receiver 16 obtains position and time data if the satellites are in view. Data is not available if the receiver is inside a building or in a tunnel. The apparatus is sealed by the manufacturer mechanically and electronically at the time of production or at an authorized repair facility.

During normal operation, when the vehicle is in motion and the global positioning receiver is working, position, velocity, time and date are stored periodically in the position log memory 13 at time intervals which are not necessarily fixed (typically, from once per second to once per several minutes). Date, time from the independent time measurement system 15, receiver 16 status, and the power supply voltage 14 are recorded at appropriate intervals ranging from once per second to once per several minutes.

If the vehicle engine is not running, power is conserved by turning off the global positioning system receiver 16. If power is removed from the apparatus 10, the independent clock 15 continues to keep time and date information. Examination of the vehicle position log will show the vehicle position when global positioning system data is available and when the vehicle is moving. It will also show the time intervals when a vehicle is expected to be in motion but no global positioning system data is received. It will also show the time intervals when the apparatus was without power. Alteration of the position log can be proven if there were significant time intervals when power was interrupted or when the engine was running but there was no available global positioning system data.

A number of alternate embodiments can be used in the motion detection apparatus. The apparatus could use an accelerometer with the ability to detect when the vehicle is in motion. Another method would be to install a microphone to detect the increase in noise associated with the vehicle being in motion. A magnetic field detector that can detect changes in vehicle orientation as it is moving can also be used. It would be obvious to use one of these detectors with non motorized vehicles.

In operation, the apparatus can determine, if the operator attempts to cheat. If the receiving antenna is covered, the apparatus knows that the engine is running. Therefor if no global position fixes are obtained, the log would show a problem. If power is interrupted to the apparatus, the position log memory would show interrupted sequences of time checks.

While I have described my invention in connection with specific embodiments thereof, it is clearly to be understood that this is done only by way of example and not as a limitation to the scope of my invention as set forth in the objects thereof and in the appended claims.

I claim:

1. An apparatus for recording vehicle position, for use in applications that require detection of attempts to alter the information being recorded, comprising:

housing means for enclosing said apparatus;

a global positioning system receiver for obtaining time and position information from a satellite;

a time measurement system comprising a timepiece having a battery backup;

vehicle motion detection means for determining the movement of the vehicle at any time;

said vehicle motion detection means comprising means for measuring the power supply voltage of said vehicle for determining variances in said voltage, specifically measuring the voltages that can be expected when the engine is started and running and voltages present when the engine is stopped;

a microprocessor having program storage having means for accepting data from said global positioning system receiver and for controlling said time measurement system;

a position log memory for retaining time and position data;

means for supplying power to said apparatus; and means for determining intervals of time when power is removed from said apparatus and means for determining intervals of time when the vehicle engine is running but no global positioning information is received from a satellite.

2. An apparatus for recording vehicle position, according to claim 1, wherein:

said housing means comprises a sealed enclosure for the prevention of recording by said position log memory of falsified global positioning system receiver data.

3. An apparatus for recording vehicle position, according to claim 1, wherein:

said global positioning system receiver has signal receiving means; and said signal receiving means comprises an antenna unit.

4. An apparatus for recording vehicle position, according to claim 1, wherein:

said vehicle motion detection means comprises means for measuring vehicle acceleration and vibration: and said acceleration and vibration measuring means comprises a sensitive accelerometer or G-meter connected to said microprocessor.

5. An apparatus for recording vehicle position, according to claim 1, wherein:

said vehicle motion detection means comprises audio measuring means; and said audio measuring means comprises a microphone, amplifier and filter connected to said microprocessor.

6. An apparatus for recording vehicle position, according to claim 1, wherein:

said vehicle motion detection means comprises means for measuring the earth's magnetic field; and said magnetic field measurement means comprises a magnetic field detector or compass connected to said microprocessor.

7. An apparatus for recording vehicle position, according to claim 1, wherein:

said position log memory having power outage data retention means for holding onto data when the power is removed from said apparatus.

8. An apparatus for recording vehicle position, according to claim 1, wherein:

said interval determining means comprises recording devices which measure date and time data when power is supplied to said apparatus at a pre-determined time interval.

* * * * *